(12) United States Patent
Pappachan et al.

(10) Patent No.: US 12,432,186 B2
(45) Date of Patent: Sep. 30, 2025

(54) SYSTEM AND METHOD FOR SECURE AND PERFORMANT ECU PAIRING

(71) Applicant: Robert Bosch GmbH, Stuttgart (DE)

(72) Inventors: Pradeep Pappachan, Pittsburgh, PA (US); Jorge Guajardo Merchan, Pittsburgh, PA (US); Christian Matthias Didong, Sinzig (DE); Shalabh Jain, Pittsburgh, PA (US); Stefan Gehrer, Pittsburgh, PA (US)

(73) Assignee: Robert Bosch GmbH (DE)

( * ) Notice: Subject to any disclaimer, the term of this patent is extended or adjusted under 35 U.S.C. 154(b) by 255 days.

(21) Appl. No.: 18/122,958

(22) Filed: Mar. 17, 2023

(65) Prior Publication Data

US 2024/0314109 A1    Sep. 19, 2024

(51) Int. Cl.
*G06F 21/00*    (2013.01)
*B60R 16/023*    (2006.01)
*H04L 9/40*    (2022.01)

(52) U.S. Cl.
CPC ...... *H04L 63/0435* (2013.01); *B60R 16/0231* (2013.01); *H04L 63/061* (2013.01)

(58) Field of Classification Search
CPC .......................... H04L 63/0435; H04L 63/061; B60R 16/0231
See application file for complete search history.

(56) References Cited

U.S. PATENT DOCUMENTS

| | | | |
|---|---|---|---|
| 2016/0072778 A1* | 3/2016 | Panton ............... | H04L 63/061 713/171 |
| 2016/0099814 A1* | 4/2016 | Negi ................... | H04L 9/3268 713/171 |
| 2019/0044730 A1* | 2/2019 | Woo .................... | H04L 12/40 |
| 2019/0238555 A1* | 8/2019 | Buffard ............... | H04L 63/0823 |
| 2020/0084025 A1* | 3/2020 | Ujiie .................. | B60R 16/0231 |
| 2023/0076669 A1* | 3/2023 | Acharya ............. | H04L 9/0816 |

OTHER PUBLICATIONS

Website for "Kerberos: The Network Authentication Protocol," retrieved from http://web.mit.edu/kerberos/, retrieved on Mar. 17, 2023, pp. 1-2.

* cited by examiner

*Primary Examiner* — Michael M Lee
(74) *Attorney, Agent, or Firm* — Dickinson Wright PLLC

(57) ABSTRACT

Systems and methods relate to pairing a first electronic control unit (ECU) to a second ECU. First identification data of the first ECU is transmitted to the second ECU. Second identification data of the second ECU is received from the second ECU. After a request to pair, the first ECU receives session data from a server. The session data includes a session identifier (ID) to identify the pairing, a master session key (MSK), a first token, and security information of the second ECU. The first ECU derives session keys based on the MSK. The session ID and the first token's encryption first token are transmitted to the second ECU. The first ECU receives and decrypts encryption of a second token from the second ECU. Secure communication is established between the first ECU and the second ECU via the session keys after the first ECU validates the second token.

20 Claims, 4 Drawing Sheets

SYSTEM AND METHOD FOR SECURE AND PERFORMANT ECU PAIRING

FIELD

This disclosure relates generally to pairing devices, and more particularly to performing a secure pairing between electronic control units.

BACKGROUND

In general, electronic Control Units (ECUs) control several subsystems of modern automobiles. In this regard, ECUs may need to communicate with each other to ensure the proper functioning of one or more of these subsystems. For certain applications, ECUs might exchange private data of a sensitive nature, which should be protected. However, embedded devices, such as ECUs, are usually constrained in terms of computational power and memory, and therefore certain cryptographic protocols and algorithms (such as asymmetric key algorithms for authentication and key exchange) are not well suited for protecting a flow of data between ECUs.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes sending first identification data of a first ECU to a second ECU. The method includes receiving second identification data of the second ECU from the second ECU. The method includes sending a message to a server. The message indicates a request to establish a pairing between the first ECU and the second ECU. The method includes receiving session data from the server, wherein the session data includes (a) session identification data to identify the pairing between the first ECU and the second ECU, (b) a master session key (MSK), (c) a first token, and (d) security information of the second ECU. The method includes generating one or more session keys based on the MSK. The method includes sending the session identification data and an encryption of the first token to the second ECU. The method includes receiving an encryption of a second token from the second ECU. The method includes decrypting the encryption of the second token using the one or more session keys. The method includes validating the second token using the second identification data of the second ECU. The method includes establishing secure communication with the second ECU via at least the one or more session keys after the second token is validated.

According to at least one aspect, a system for secure pairing includes at least a first ECU. The first ECU includes (i) a processor and (ii) a non-transitory computer readable medium in data communication with the processor. The non-transitory computer readable medium has computer readable data including instructions stored thereon that when executed by the processor is configured to cause the processor to perform a method. The method includes sending first identification data of a first ECU to a second ECU. The method includes receiving second identification data of the second ECU from the second ECU. The method includes sending a message to a server. The message indicates a request to establish a pairing between the first ECU and the second ECU. The method includes receiving session data from the server, wherein the session data includes (a) session identification data to identify the pairing between the first ECU and the second ECU, (b) a master session key (MSK), (c) a first token, and (d) security information of the second ECU. The method includes generating one or more session keys based on the MSK. The method includes sending the session identification data and an encryption of the first token to the second ECU. The method includes receiving an encryption of a second token from the second ECU. The method includes decrypting the encryption of the second token using the one or more session keys. The method includes validating the second token using the second identification data of the second ECU. The method includes establishing secure communication with the second ECU via at least the one or more session keys after the second token is validated.

According to at least one aspect, a non-transitory computer readable medium having computer readable data including instructions stored thereon that, when executed by a processor, cause the processor to perform a method for secure pairing. The method includes sending first identification data of a first ECU to a second ECU. The method includes receiving second identification data of the second ECU from the second ECU. The method includes sending a message to a server. The message indicates a request to establish a pairing between the first ECU and the second ECU. The method includes receiving session data from the server, wherein the session data includes (a) session identification data to identify the pairing between the first ECU and the second ECU, (b) a master session key (MSK), (c) a first token, and (d) security information of the second ECU. The method includes generating one or more session keys based on the MSK. The method includes sending the session identification data and an encryption of the first token to the second ECU. The method includes receiving an encryption of a second token from the second ECU. The method includes decrypting the encryption of the second token using the one or more session keys. The method includes validating the second token using the second identification data of the second ECU. The method includes establishing secure communication with the second ECU via at least the one or more session keys after the second token is validated.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling within the spirit and scope of this disclosure.

Figure 1:
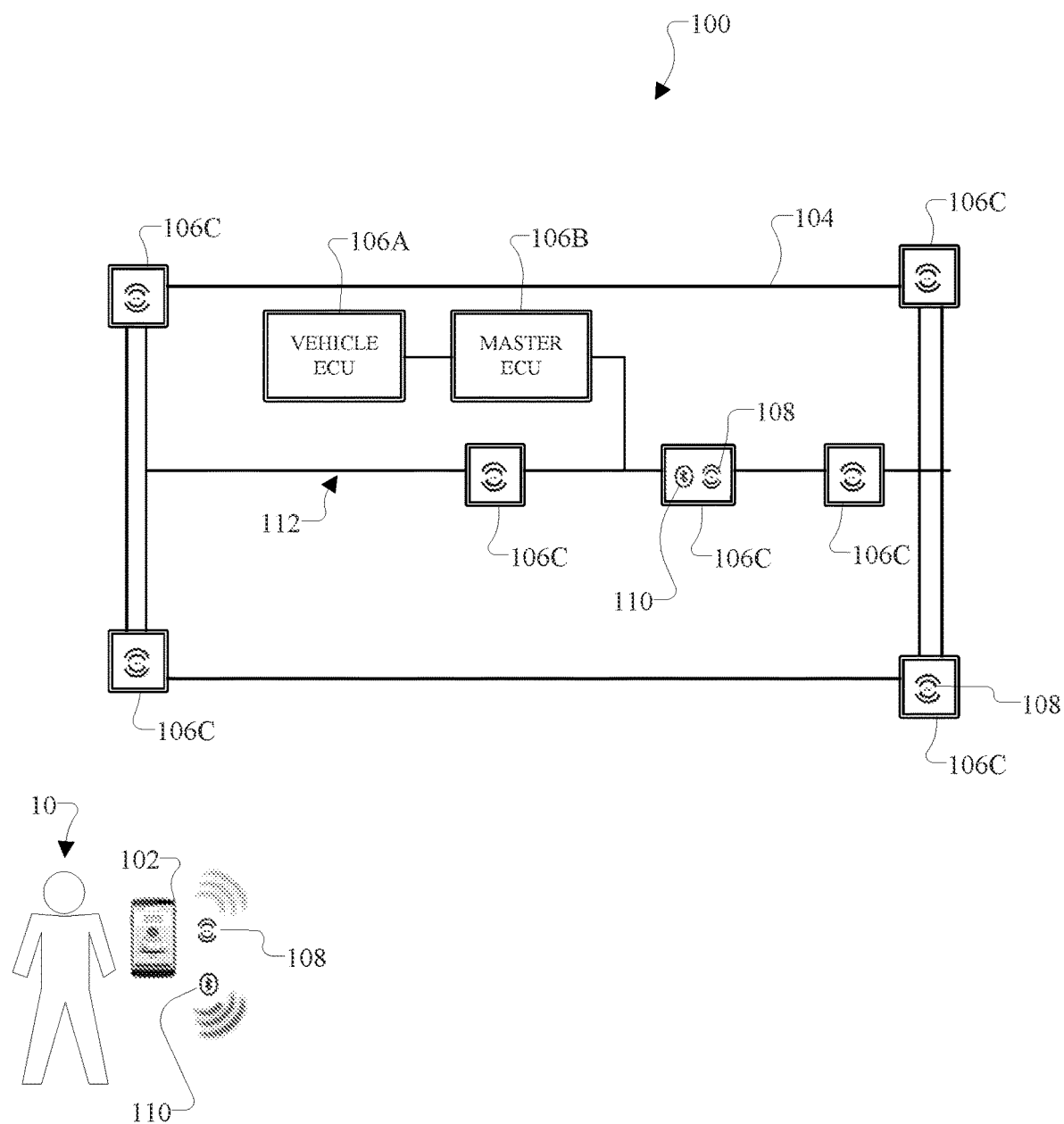
FIG. 1 is a diagram of an example of a remote keyless entry system according to an example embodiment of this disclosure.

FIG. 1 is a diagram of a vehicle 104 with a remote keyless entry (RKE) system 100 according to an example embodiment. The vehicle 104 may be any type of mobile machine (e.g., sedan, truck, bus, motorcycle, aircraft, boat, etc.). In this example, the RKE system 100 includes an ECU network that includes at least a master ECU 106B and several ranging/slave ECUs 106C. Each ECU 106 (e.g., master ECU 106B and/or ranging ECU 106C) may include wireless technology (e.g., ultra-wideband (UWB) technology, Bluetooth® technology, or a combination thereof). In this example, the master ECU 106B and the ranging ECUs 106C control various functions and/or operations relating to RKE. Also, one or more vehicle ECUs 106A may be connected to this ECU network. The one or more vehicle ECUs 106A may control one or more aspects of the vehicle 104 such as braking, engine, transmission, airbag, etc.

The ranging ECUs 106C may be located at various positions with respect to the vehicle 104. For example, as shown in FIG. 1, there may be some externally located ranging ECUs 106C around a periphery of the vehicle 104. In this regard, for instance, the externally located ranging ECUs 106C may include UWB technology and may serve as UWB nodes. The ranging ECUs 106C may also include some internally located ranging ECUs 106C with UWB technology, Bluetooth® technology, or a combination thereof. The ranging ECUs 106C include UWB radios 108 that are configured to communicate with a communication device, e.g. a smartphone 102 of a user 10, to locate a position of a user 10 with respect to the vehicle 104. The ranging ECUs 106C may include Bluetooth technology 110 to communicate in the Bluetooth (BLE) range. More specifically, for example, when the user's smartphone 102 is in Bluetooth (BLE) range, then authentication between the smartphone 102 and the Master ECU 106B is performed with Bluetooth® technology 110 over the BLE channel. Also, when the smartphone 102 is within UWB range, then the UWB radio 108 is activated, and secure ranging is performed by the ranging ECUs 106C to fix the location of the user 10. This information is transmitted by the ranging ECUs 106C to the Master ECU 106B over the in-vehicle network (IVN) 112, e.g., a controller area network (CAN) bus and/or a communication network, which then triggers at least one function (e.g., passive entry, lock, unlock, etc.).

Unfortunately, there are several ways in which an attacker may compromise this type of RKE system 100. Some of the attacks require the attacker to have physical access to the vehicle 104, while other attacks may be accomplished remotely. For example, an attacker may insert a malicious device (interposer) on the IVN 112 that may be able to modify messages between a ranging ECU 106C and the master ECU 106B to trigger RKE functions. An attacker may remotely compromise another ECU 106 on the IVN 112 and may masquerade as a ranging ECU 106C to accomplish the same objective as the first attack. As another example, an attacker may replace a legitimate ranging ECU 106C with a malicious device, thereby gaining control of the RKE system 100 in a number of instances, such as when the vehicle 104 is taken to a repair facility to replace a ranging ECU 106C, which is not working properly. Also, an attacker could use an ECU 106 that has an older, defective version of firmware that has known vulnerabilities that may be exploited. As yet another example, an attacker could compromise a ranging ECU 106C and/or the master ECU 106B and make replicas of that ECU 106C/106B for illegal (counterfeit) placement in other vehicles 104.

Figure 2:
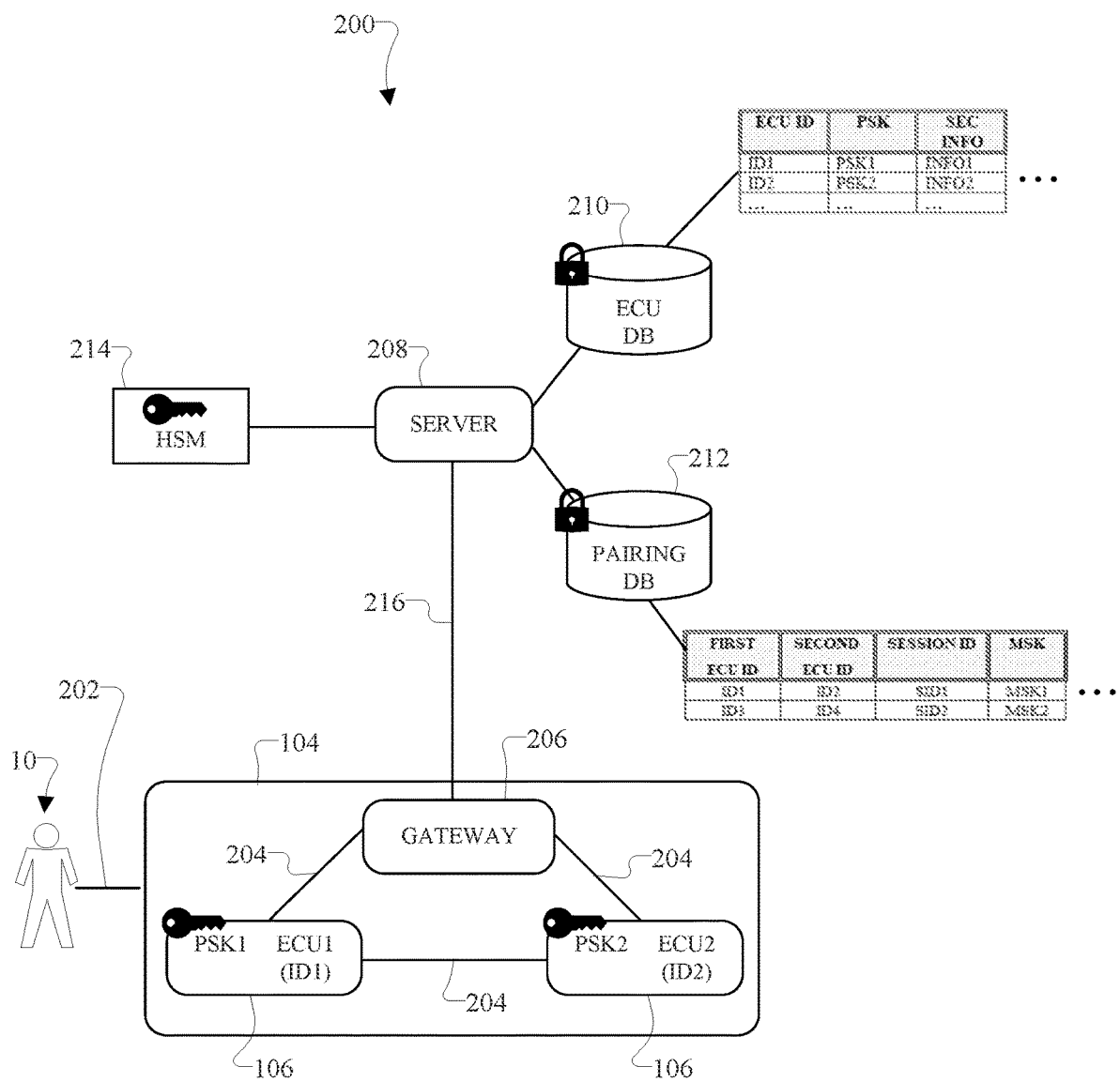
FIG. 2 is a diagram of an example of a secure ECU pairing system according to an example embodiment of this disclosure.

FIG. 2 is a diagram of a system 200 configured to provide secure, performant ECU pairing with respect to a vehicle 104 according to an example embodiment. The system 200 is configured to provide a number of safeguards against the attacks discussed above. In this regard, for example, the system 200 is configured to protect the integrity and confidentiality of the messages between the master ECU 106B and one or more ranging ECUs 106C on an internal network (e.g., CAN bus) because such internal networks may not have any built-in security features. More specifically, for example, in-vehicle networks, such as CAN, do not support cryptographic operations such as encryption and integrity protection natively in hardware. While ECU messages may be protected by cryptographic methods in software, this system 200 is configured such that the ranging ECUs 106C and the master ECU 106B mutually authenticate each other during pairing to prevent man-in-the-middle attacks and masquerading attacks, such as described in the first, second, and third attack examples discussed above. By recognizing that unpatched firmware in ECUs 106 may be a source of vulnerabilities that the attacker may exploit, as in the fourth attack example discussed above, the system 200 is configured such that the ECUs 106 evaluate each other's security posture during authentication before a pairing decision is made. In addition, the system 200 is configured to track the pairing of ECUs 106 in vehicles 104 to prevent illegal copies of compromised ECUs 106 from being used by adversaries, as when an attacker compromises a ranging/master ECU 106 and makes replicas of that ECU 106 for illegal (counterfeit) placement in several vehicles 104.

FIG. 2 is a simplified diagram of the vehicle 104, which illustrates a set of ECUs 106 and the gateway 206 for purposes of explaining the system 200. In this regard, the vehicle 104 obviously includes other components, which are not shown and described with respect to this discussion. Referring to FIG. 2, the set of ECUs 106 may include any suitable number of ECUs 106 for pairing. In this case, the set of ECUs 106 includes at least a first ECU 106 and a second ECU 106. The ECUs 106, which are to be paired, and the gateway 206 are connected through the IVN 204 (e.g., IVN 112). The gateway 206 is configured to serve as a conduit for the flow of messages between the ECUs 106 and the backend server 208 over a public communication network 216. The gateway 206 may be untrusted, as the gateway 206 is not configured to play a role in the security of the system 200.

Each ECU 106 has unique identification data, such as a unique identifier (ID), which is generated and provisioned to that ECU 106 during manufacturing. For example, in FIG. 2, the first ECU 106 has a unique ID (denoted as ID1) and the second ECU 106 has a unique ID (denoted as ID2). In some instances, the first ECU 106 may be referred to as "$E_1$" while the second ECU 106 may be referred to as "$E_2$." More specifically, in FIG. 2, for instance, the first ECU 106 ($E_1$) is a master ECU 106B and the second ECU 106 ($E_2$) is a ranging/slave ECU 106C.

The ECUs 106 may be provisioned with several keys that serve different functions. As an example, for instance, each ECU 106 is provisioned with a pre-shared key (PSK). Each ECU 106 shares its PSK with a trusted backend server 208, which may be referred to as "B," for example, in FIG. 3, FIG. 4, TABLE1 and TABLE2. For example, the first ECU 106 shares its PSK (denoted as PSK1) with the backend server 208. Also, the second ECU 106 shares its PSK (denoted as PSK2) with the backend server 208. Keys, which are derived from a PSK, may be used to send messages with confidentiality and integrity between its ECU 106 and the backend server 208.

The ECU pairing protocol 300/400, which is described later, is triggered by at least one entity having privileged diagnostic access 202 to the vehicle 104. As a non-limiting example, the entity may include a trusted entity in a manufacturing facility, a technician at a repair facility where ECUs 106 may be replaced and re-paired, a technician that acts as a mediator between the vehicle 104 and a trusted backend server 208, any suitable entity, or any number and combination thereof. The entity is configured to initiate the pairing process. In this example, the entity has no other role to play in the pairing process besides initiating it.

In addition, the system 200 includes a trusted backend server 208, which facilitates the pairing process and the tracking of ECUs 106. The backend server 208 may be maintained by any trusted entity. As an example, in FIG. 2, for instance, the backend server 208 is maintained by an original equipment manufacturer (OEM). The backend server 208 includes at least an ECU database 210 and a pairing database 212. For a particular ECU 106, the ECU database 210 contains at least (i) unique identification data (e.g., an ECU ID such as $E_1 ID$) of that particular ECU, (ii) a PSK shared between the backend server 208 and that particular ECU, and (iii) security information (e.g., ECU model data, firmware version data, etc.) for that particular ECU. This information is initially populated in the ECU database 210 when the ECU is manufactured and before pairing the ECUs 106. Also, the ECU database 210 includes some information, such as the firmware version of the ECU, which may change over the lifetime of the ECU. Therefore, this information may be updated in the ECU database 210 when one or more ECUs 106 are patched with the latest versions of their firmware. When an ECU 106 authenticates to the backend server 208 during the pairing protocol 300/400, then that ECU 106 can attest to the backend server 208 and the attestation report can contain information such as firmware version and cryptographic hash of firmware, which can then be verified for consistency by the backend server 208 with the help of the ECU database 210. In addition, the pairing database 212 tracks at least the current pairing of each ECU 106 in the ECU database 210. During the pairing protocol 300/400, an entry is dynamically created in the pairing database 212 for the pair of ECUs 106 that are to be paired. The pairing database 212 includes (i) ECU IDs of the ECUs that are pairing/paired, (ii) a unique session ID (SID) identifying this pairing of ECUs, and (iii) a master session key (MSK) that is communicated by the backend server 208 to the ECUs 106 from which these ECUs 106 derive specific session keys for encryption and integrity protection.

Since the contents of the ECU database 210 and the pairing database 212 are critical and security sensitive, these databases must be protected from attacks. For example, in FIG. 2, the backend server 208 employs a Hardware Security Module (HSM) 214 to store keys that are used to encrypt and/or decrypt the sensitive information (e.g., ECU IDs, MSKs, SID, PSKs, etc.) contained in the ECU database 210 and the pairing database 212. Alternatively, the HSM 214 may be replaced by a trusted execution environment (TEE) and at least one database where the TEE keeps the secrets used to encrypt the database and acts as a proxy to access and process data in the database. Also, access to the backend server 208 may be mediated by a trusted testing device that is locally available. The job of the local testing device might be to download a number of credentials from the backend server 208 for use during offline (no connectivity to backend server 208 available) time or to act as a bridge between a vehicle 104 without external connectivity and the backend server 208. If the local testing device is to be used to download credentials from the backend server 208, then the local testing device should have secure storage as provided by hardware security module or a trusted execution environment (TEE) such as Intel software guard extensions (SGX), ARM TrustZone, any applicable security technology, or any number and combination thereof.

Figure 3:
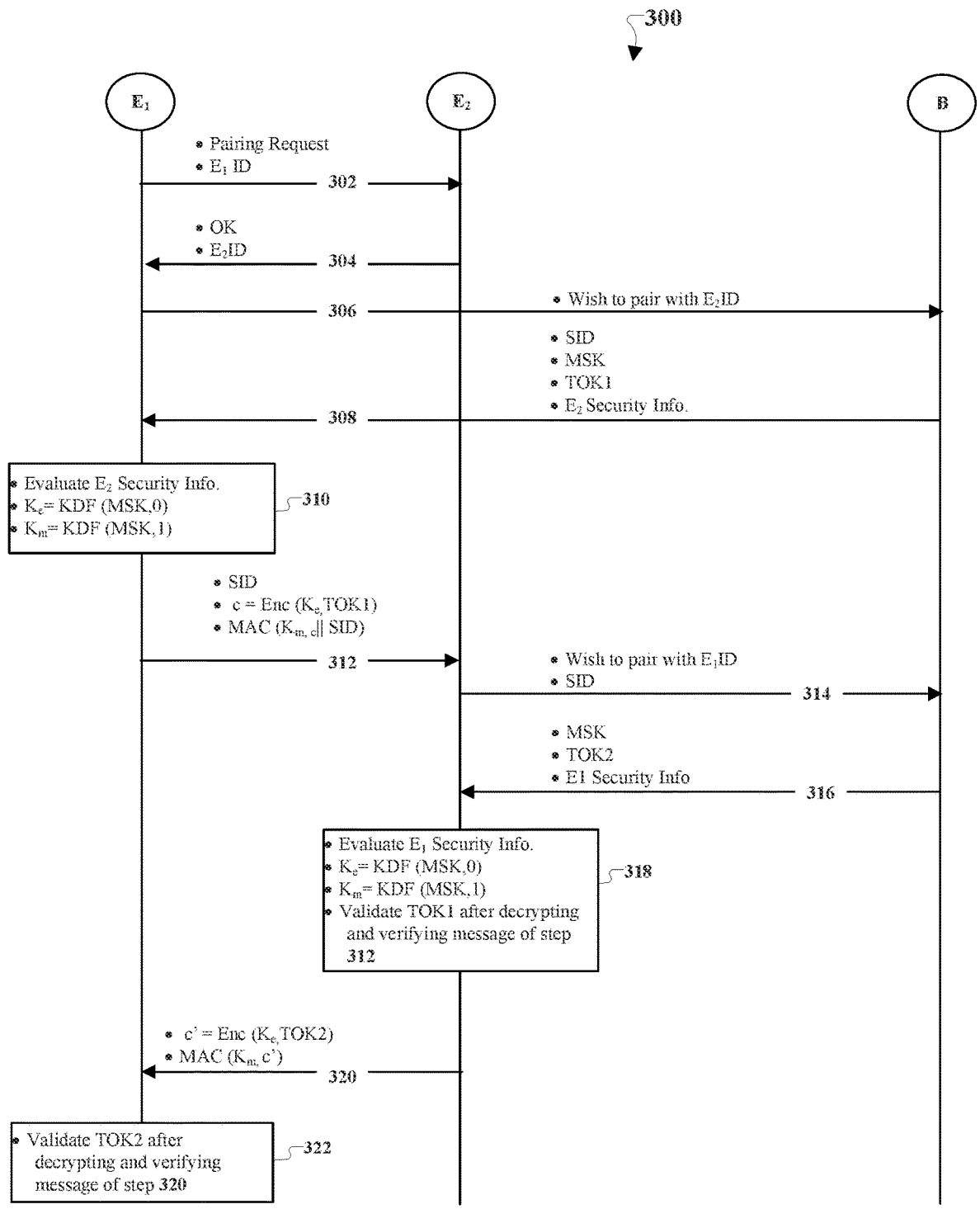
FIG. 3 is a sequence diagram of an example of a secure ECU pairing protocol according to an example embodiment of this disclosure.

FIG. 3 is a sequence diagram of an example of a secure, symmetric key protocol 300 for pairing at least two ECUs 106 to each other via the backend server 208. In FIG. 3, the first ECU 106 is denoted as "$E_1$," the second ECU 106 is denoted as "$E_2$," and the trusted backend server 208 is denoted as "B." In this example, each ECU 106 authenticates to the backend server 208 directly and communicates over a secure communication channel. In this regard, for instance, each ECU 106 communicates with confidentiality and integrity over an encrypted channel. The steps for accomplishing this have been left out of the protocol 300 for brevity. Also, in this example, each ECU 106 has a PSK with a backend server 208 such that the backend server 208 is configured to use the PSK to send encrypted information to that ECU 106. For instance, in this example, the PSKs (e.g. PSK1 and PSK2) are provisioned into the ECUs (e.g., $E_1$ and $E_2$) by the manufacturer. In addition, TABLE 1 provides information regarding the secure, symmetric key protocol 300, which is illustrated in FIG. 3.

TABLE 1

| Ref. No. | From/To | Message/Operation |
|---|---|---|
| 302 | $E_1 \to E_2$ | Request to pair, $E_1 ID$ |
| 304 | $E_2 \to E_1$ | OK, $E_2 ID$ |
| 306 | $E_1 \to B$ | Wish to pair with $E_2 ID$ |
| 308 | $B \to E_1$ | SID, MSK, TOK1, $E_2$ security info. |
| 310 | $E_1$ | Evuate $E_2$ security info., $K_e$ = KDF (MSK, 0), $K_m$ = KDF (MSK, 1) |
| 312 | $E_1 \to E_2$ | SID, c = Enc ($K_e$, TOK1), MAC ($K_m$, c‖SID) |
| 314 | $E_2 \to B$ | Wish to pair with $E_1$ ID, SID |
| 316 | $B \to E_2$ | MSK, TOK2, $E_1$ security info. |
| 318 | $E_2$ | Evaluate $E_1$ security info $K_e$ = KDF (MSK, 0), $K_m$ = KDF (MSK, 1) Validate TOK1 after decrypting and verifying message of step 312 |
| 320 | $E_2 \to E_1$ | c' = Enc ($K_e$, TOK2), MAC ($K_m$, c') |
| 322 | $E_1$ | Validate TOK2 after decrypting and verifying message of step 320 |

At step 302, according to an example, the first ECU 106 initiates the protocol 300 with the second ECU 106 by sending at least one message, which includes a pairing request and its own unique ID (denoted as $E_1 ID$), to the second ECU 106. Also, the second ECU 106 receives at least one message of step 302 from the first ECU 106.

At step 304, according to an example, the second ECU 106 responds at least to the pairing request of the first ECU 106. More specifically, for example, the second ECU 106 sends at least one message, which includes acknowledgement (denoted by OK) of the pairing request and its own unique ID (denoted as E$_2$ID), to the first ECU 106. Also, the first ECU 106 receives at least one message of step 304 from the second ECU 106.

At step 306, according to an example, the first ECU 106 requests the backend server 208 to facilitate pairing with the second ECU 106 after receiving E$_2$ID via at least one message of step 304 from the second ECU 106. In this regard, the first ECU 106 sends at least one message to the backend server 208. The message includes a pairing request indicating a desire of the first ECU 106 to pair with the second ECU 106. In the message, the first ECU 106 sends E$_2$ID to the backend server 208 to identify the second ECU 106 for the desired pairing. Also, the backend server 208 receives at least one message of step 306 from the first ECU 106.

At step 308, according to an example, the backend server 208 generates a unique session identifier (SID) relating to the pairing request of the first ECU 106 with respect to the second ECU 106. In addition, the backend server 208 generates a first token (denoted as TOK1), which contains the first ECU's ID (E$_1$ID) that is encrypted via PSK2 (i.e., the pre-shared key of the second ECU 106 as obtained from the ECU database 210), where PSK2 is shared between the backend server 208 and the second ECU 106. In this regard, the token (TOK1) in this protocol 300 may be similar to the ticket-granting ticket (TKT), which is issued or granted to the client in the Kerberos Authentication Protocol. Also, the backend server 208 generates an ephemeral MSK, which is associated with the SID. Upon receiving E$_2$ID, the backend server 208 obtains the second ECU's security information (i.e., E$_2$'s security information) from the ECU database 210 using E$_2$ID as a query.

In addition, at least one entry is created in the pairing database 212, which includes and associates the SID (e.g., SID1), the MSK (e.g., MSK1), the first ECU 106 via E$_1$ID (e.g., ID1 in FIG. 2), and the second ECU via E$_2$ID (e.g., ID2 in FIG. 2) with each other. For example, as shown in FIG. 2, the SID (e.g., SID1), an MSK (e.g., MSK1), an E$_1$ID (e.g., ID1 in FIG. 2), and an E$_2$ID (e.g., ID2 in FIG. 2) are stored in relation to each other in the pairing database 212. In addition, the backend server 208 sends at least one message, which includes at least the SID, the MSK, TOK1, and E$_2$'s security information, to the first ECU 106 over an encrypted and integrity-protected channel via the public communication network 216. Also, the first ECU 106 receives at least one message of step 308 from the backend server 208.

At step 310, according to an example, the first ECU 106 evaluates the security information of the second ECU 106 (i.e., E$_2$'s security information). More specifically, as an example, E$_2$'s security information includes ECU model data of the second ECU 106, firmware version data of the second ECU 106, any relevant data relating to the second ECU 106, or any number and combination thereof. The evaluation may include determining if one or more predetermined conditions and/or thresholds are satisfied. For instance, the evaluation may include determining whether or not the ECU model data and/or the firmware version data satisfy certain criteria. As an example, for instance, the evaluation may include determining whether the ECU model data of the second ECU 106 is a predetermined model number. Also, as an example, the evaluation may include determining whether the firmware version of the second ECU 106 is an updated version and not a buggy version. If the first ECU 106 is not satisfied with the evaluation of E$_2$'s security information, then the protocol 300 may terminate. Alternatively, if the first ECU 106 is satisfied with the evaluation of the security information of the second ECU 106 (E$_2$'s security information), then the first ECU 106 derives one or more session keys. For example, in FIG. 3, the session keys include an encryption key (K$_e$) and a message authentication code (MAC) key (K$_m$).

The encryption key (K$_e$) is used to encrypt one or more messages. Also, the encryption key (K$_e$) is used to decrypt one or more encrypted messages. The encryption key (K$_e$) is derived from the MSK and a subset of other session information (e.g., SID, at least one ECU's ID, a token TOKi where i represents an integer value greater than zero, etc.). More specifically, for instance, in FIG. 3, the encryption key (K$_e$) is generated from a key derivation function (KDF), which takes the MSK and a unique constant (e.g., 0) as input as expressed by K$_e$=KDF (MSK, 0).

The MAC key is used to authenticate and protect the data integrity of one or more messages. The MAC key (K$_m$) is derived from the MSK and a subset of other session information (e.g., SID, at least one ECU's ID, a token TOKi where i represents an integer value greater than zero, etc.). For example, in FIG. 3, the MAC key (K$_m$) is generated from the KDF, which takes the MSK and a unique constant (e.g., 1) as input as expressed by K$_m$=KDF (MSK, 1). The unique constants, which are used as inputs for the KDFs, are different to ensure that different keys (i.e., K$_e$ and K$_m$) are derived from the same MSK.

At step 312, according to an example, the first ECU 106 encrypts and MACs at least one message, which includes at least the first token (TOK1), and sends this result to the second ECU 106. More specifically, in FIG. 3, for example, the first ECU 106 generates ciphertext (denoted as c) by encrypting the string TOK1 via the encryption key (K$_e$) as represented by c=Enc (K$_e$, TOK1). Also, the first ECU 106 computes a MAC, which is a unique value. In FIG. 3, the MAC is computed from the MAC key (K$_m$) and an input string (e.g., c∥SID), as represented by MAC (K$_m$, c∥SID), where the symbol ∥ is used to represent a concatenation between a first element (e.g., ciphertext c) and a second element (e.g., session ID). In this case, the input string is a concatenation of the ciphertext (c) and the session ID (SID). In addition, the first ECU 106 sends at least one message, which includes the ciphertext, the SID in plaintext, and the MAC, to the second ECU 106. Also, the second ECU 106 receives at least one message of step 312 from the first ECU 106.

As discussed above, the first ECU 106 computes the MAC to detect tampering or integrity violations of the message (e.g., c∥SID). In this regard, for example, if an adversary tampers with the message (e.g., c∥SID), then the adversary may also modify the MAC so that the receiver of the message does not detect a discrepancy between the input string and the MAC. However, the computation of a valid MAC is possible only if the MAC key (K$_m$) is known. So, if the MAC key (K$_m$) is secret and only known to an authorized sender (e.g., first ECU 106) and an authorized receiver (e.g., second ECU 106), then a third party (e.g., adversary) cannot forge a valid MAC for a modified message. Accordingly, the message is encrypted with the encryption (K$_e$) to protect the confidentiality of a message and also appended with the MAC to protect the integrity of that message. In other words, the encryption ensures confidentiality of the message while the MAC ensures that integrity violations (e.g., message modifications) are detectable.

At step 314, according to an example, the second ECU 106 requests the backend server 208 to facilitate its pairing with the first ECU 106. Upon obtaining the SID from the first ECU 106, the second ECU 106 sends at least one message to the backend server 208. The message contains the SID along with the second ECU's pairing request to facilitate pairing with the first ECU 106. With respect to the pairing request, the second ECU 106 sends $E_1ID$ to the backend server 208 to identify the first ECU 106 for the desired pairing. Also, the backend server 208 receives at least one message of step 314 from the second ECU 106.

At step 316, according to an example, the backend server 208 obtains the ephemeral MSK from the pairing database 212 via a query using SID. In addition, the backend server 208 obtains the first ECU's security information ($E_1$'s security information) from the ECU database 210 via a query based on $E_1ID$, which was received at step 314. Also, the backend server 208 generates a second token TOK2, which contains the unique ID of the second ECU 106 (i.e., $E_2$'s ID) that is encrypted with PSK1 (i.e., the pre-shared key of the first ECU 106 as obtained from the ECU database 210), where PSK1 is shared between the backend server 208 and the first ECU 106. The backend server 208 sends at least one message to the second ECU 106. In this example, the MSK, the TOK2, and the first ECU's ($E_1$'s) security information are sent as at least one message. Also, the second ECU 106 receives at least one message of step 316 from the backend server 208.

At step 318, according to an example, the second ECU 106 evaluates the first ECU's security information (i.e., $E_1$'s security information). As an example, for instance, $E_1$'s security information includes ECU model data of the first ECU 106, firmware version data of the first ECU 106, any relevant data relating to the first ECU 106, or any number and combination thereof. The evaluation may include determining if one or more predetermined conditions and/or thresholds are satisfied. For instance, the evaluation may include determining whether or not the ECU model data and/or the firmware version data satisfy certain criteria. As an example, for instance, the evaluation may include determining whether the ECU model data of the first ECU 106 is a predetermined model number. Also, as an example, the evaluation may include determining whether the firmware version of the first ECU 106 is an updated version and not a buggy version. If the second ECU 106 is not satisfied with the evaluation of $E_1$'s security information, then the protocol 300 may terminate. Alternatively, if the second ECU 106 is satisfied with the evaluation of $E_1$'s security information, then the second ECU 106 derives one or more session keys. For example, in FIG. 3, the session keys include an encryption key ($K_e$) and a MAC key ($K_m$).

The encryption key ($K_e$) is derived from the MSK and a subset of other session information (e.g., SID, at least one ECU's ID, a token TOKi where i represents an integer value greater than zero, etc.). For example, in FIG. 3, the encryption key ($K_e$) is generated from a KDF, which takes the MSK and a unique constant (e.g., 0) as input, as expressed by $K_e$=KDF (MSK, 0). The encryption key ($K_e$) is used to encrypt one or more messages. Also, the encryption key ($K_e$) is used to decrypt one or more encrypted messages.

The MAC key ($K_m$) is derived from the MSK and a subset of other session information (e.g., SID, at least one ECU's ID, a token TOKi where i represents an integer value greater than zero, etc.). For example, in FIG. 3, the MAC key ($K_m$) is generated from the KDF, which takes the MSK and a unique constant (e.g., 1) as input, as expressed by $K_m$=KDF (MSK, 1). These unique constants, which may be used as inputs for the KDFs, are different to ensure that different keys (i.e., $K_e$ and $K_m$) are derived from the same MSK.

As discussed above, the derivation of $K_e$ and $K_m$, by the second ECU 106 at step 318 is similar to the derivation of $K_e$ and $K_m$, by the first ECU 106 at step 310. In addition, the second ECU 106 validates the first token (TOK1), which should contain the unique ID ($E_1ID$) of the first ECU 106 that the first ECU 106 sent to the second ECU 106 at step 302 after decrypting and verifying the encrypted message of step 312 (because the second ECU 106 now possesses the encryption key $K_e$ and the MAC key $K_m$). This step enables the second ECU 106 to authenticate the first ECU 106.

At step 320, according to an example, the second ECU 106 encrypts and MACs TOK2 and sends these items to the first ECU 106. More specifically, in FIG. 3, for example, the second ECU 106 generates ciphertext (denoted as c') by encrypting the string TOK2 using the encryption key ($K_e$), as represented by c'=Enc ($K_e$, TOK2). Also, the second ECU 106 computes a MAC, which is a unique value. In FIG. 3, the MAC is computed using the MAC key ($K_m$) and the ciphertext (c') as represented by MAC ($K_m$, c'). In addition, the second ECU 106 sends at least one message to the first ECU 106 in which the message includes the ciphertext (c') and the MAC ($K_m$, c'). Also, the first ECU 106 receives at least one message of step 320 from the second ECU 106.

At step 322, according to an example, the first ECU 106 decrypts the message (e.g. the ciphertext c') generated at step 320 using the encryption key ($K_e$) and verifies the integrity of that message via the MAC using the MAC key ($K_m$). After decrypting the ciphertext (c'), the first ECU 106 is configured to validate the second token (TOK2) provided that the second token (TOK2) contains the unique ID ($E_2ID$) of the second ECU 106 that the second ECU 106 sent to the first ECU 106 at step 304. This step of validating the second token (TOK2) enables the first ECU 106 to authenticate the second ECU 106.

As discussed above, FIG. 3 illustrates a secure, symmetric key protocol 300, which provides a number of advantages while achieving a number of security requirements. For example, at step 318 and step 322, each ECU 106 validates an authentication token that contains the other ECU's identity, whereby the authentication tokens come from a mutually trusted source: the backend server 208. Thus, the two ECUs 106 are configured to mutually authenticate each other indirectly with the safety and the help of the backend server 208. Also, at steps 310 and 318, each ECU 106 evaluates the security information about the other ECU 106 where the security information comes from the backend server 208. The backend server 208, in turn, is up to date about the security level of each ECU 106 because the backend server 208 is updated when ECUs 106 are patched. The backend server 208 verifies the ECU's security level when that ECU 106 connects and attests to the backend server 208. Also, as a result of the pairing protocol 300, both ECUs 106 derive identical session keys (e.g., encryption key $K_e$ and MAC key $K_m$), which are used to protect the confidentiality and the integrity of messages between these ECUs 106. Furthermore, at step 308, the backend server 208 creates an entry in the pairing database 212 to record the establishment of a pairing session between the ECUs 106 (e.g., the first ECU 106 and the second ECU 106). In the future, when one of these ECUs 106 requests to pair, the backend server 208 is configured to use the pairing database 212 to determine if that ECU 106 is still paired with another ECU and reject such a request if that ECU is still paired with another ECU. In this regard, the system 200 may be set up such that an ECU 106 must have an unpaired status or be in an unpaired state in the backend server 208 at a given instance to be paired with another ECU 106 at that given instance.

As discussed above, FIG. 3 provides an example of a secure, symmetric key protocol 300 for pairing at least two ECUs 106 to each other via the backend server 208. The pairing protocol 300 is performant because the pairing protocol 300 relies entirely on fast, symmetric key operations and no asymmetric key operations. The pairing protocol 300 does not require the use of certificates or any computationally expensive asymmetric key operations in protocols such as Diffie-Hellman key exchange and is therefore suitable for typical resource-constrained ECUs 106.

Additionally or alternatively, the secure, symmetric key protocol 300 may include one or more other variations. In this regard, there are number of different variations of the example of the protocol 300 of FIG. 3 depending, for instance, on constraints placed on the ECUs 106. Each variation to FIG. 3 may occur alone or in combination with other variations to FIG. 3. As a first variation to FIG. 3, for instance, if only one of the ECUs 106 (e.g., only $E_1$) connects to the backend server 208, then the backend server 208 is configured to send the MSK to the other ECU 106 (e.g., $E_2$) via that one ECU 106 (e.g. $E_1$) as an intermediary therebetween. As an example, for instance, the backend server 208 may only communicate with the first ECU 106 ($E_1$) and may therefore use the first ECU 106 as an intermediary to send the MSK to the second ECU 106 ($E_2$). In this case, for example, the MSK is encrypted and authenticated with a PSK (e.g., PSK2), which the backend server 208 shares with the second ECU 106 ($E_2$). In this regard, if the second ECU 106 ($E_2$) decrypts the MSK, then the second ECU 106 ($E_2$) proves to the first ECU 106 ($E_1$) that the second ECU 106 ($E_2$) is authentic. Similarly, the fact that the backend server 208 released the MSK to the first ECU 106 ($E_1$) proves to the second ECU 106 ($E_2$) that the first ECU ($E_1$) is authentic.

In FIG. 3, the requesting ECU 106 (e.g., the first ECU 106) provides the other ECU 106 (e.g., the second ECU 106) with its ID (e.g., $E_1$ID) and similarly the other ECU 106 (e.g., the second ECU 106) responds with its ID (e.g., $E_2$ID). As a second variation to FIG. 3, for instance, when the first ECU 106 ($E_1$) requests to pair with the second ECU 106 ($E_2$), then the first ECU 106 ($E_1$) only sends "helper" data needed to reconstruct its ID (e.g., $E_1$ID) to the second ECU 106 ($E_2$). The second ECU 106 ($E_2$) then measures some physical property from the first ECU 106 ($E_1$) and uses the helper data received from the first ECU 106 ($E_1$) to re-create/reconstruct the ID (e.g., $E_1$ID). This has the advantage that an ID of another ECU 106 is something that an ECU 106 measures rather than something that is received which increases confidence that the second ECU 106 ($E_2$) is pairing with the first ECU 106 ($E_1$) and not with a fake ECU. In this case, the assumption is that the ID is measured from a physical property that is difficult to duplicate. Examples of such physical properties might include timing response to certain commands, power consumption of certain software being executed in the ECU 106, the start-up behavior of memory in any particular ECU 106, the response to a challenge from a Physically Unclonable Function (PUF), any suitable property, or any number and combination thereof. In this example, the ID and helper data are communicated via some secure alternate channel (additional measurement channel) and/or secured by other cryptographic means. Also, in this example, there includes some registration process where the helper data is pre-computed. The helper data may be stored in an ECU 106 but should be integrity protected with a MAC key only known to the backend server 208 and that ECU 106 receiving the helper data.

Also, as a third variation to FIG. 3, the system 200 may employ the same pairing protocol 300 as discussed in FIG. 3 that further includes a third device, which orchestrates and/or coordinates communication to the backend server 208. In this regard, the third device is configured to establish a channel with an ECU 106 because of its proximity or ability to physically connect (touch, physical connection) with that ECU 106. This connection may be instantiated, for example, via a smartphone, a dongle, an automotive testing/maintenance device, any suitable technological device, or any number and combination thereof. As a fourth variation, the pairing protocol 300 may be similar to the third variation, but further requires that the pairing start has to be pre-approved by an authorized human by entering authentication information (e.g., a password, a biometric, etc.) that has been previously registered and authorized by the backend server 208.

As a fifth variation to FIG. 3, the system 200 includes an implementation of an ECU 106 where the new pairing handshake can only be started by depressing a physical button on the ECU 106. After successful pairing, the button goes back to its unpressed position. This provision makes it harder for an adversary to initiate pairing without physical access to the ECU 106.

As another example, for a sixth variation to FIG. 3, the system 200 may limit the number of times that an ECU 106 is permitted to be paired with another ECU 106 as an added safeguard. In this regard, the system 200 may include a number of features to limit the number of times that an ECU 106 may be paired with another ECU 106. For example, a fuse may be added to an ECU 106 such that the fuse is blown each time that the ECU 106 is paired. Additionally or alternatively, the fuse may be configured such that once a predetermined number of fuses of the ECU 106 is blown, then the ECU 106 cannot be paired with another ECU 106. Additionally or alternatively, the system 200 may be configured such that an ECU 106 (e.g., second ECU $E_2$) is permitted only to be paired with one other ECU 106 at a time (up to N times, where N represents an integer number greater than 1), as discussed, for instance, in FIG. 4.

Figure 4:
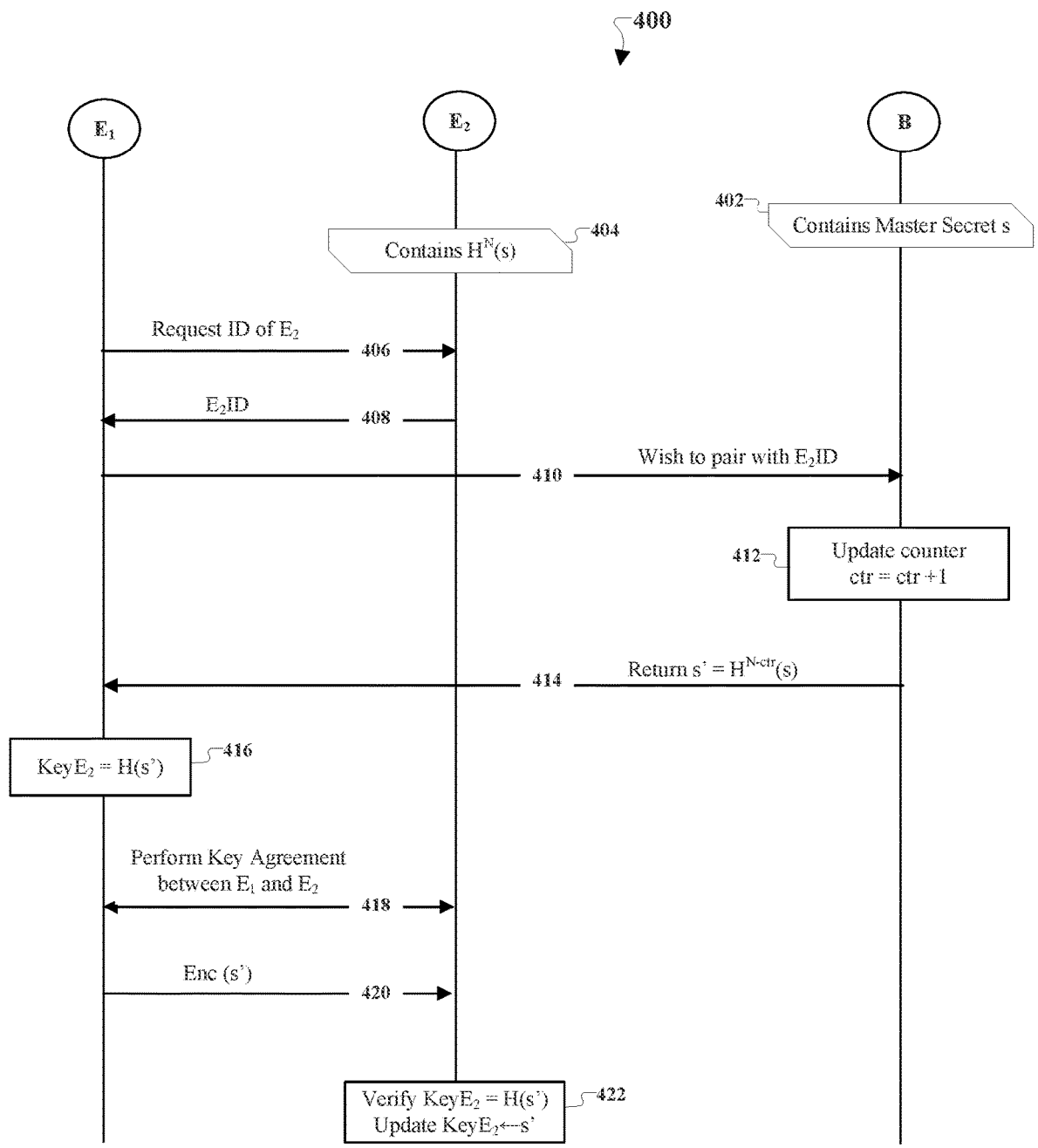
FIG. 4 is a sequence diagram of another example of a secure ECU pairing protocol according to an example embodiment of this disclosure.

FIG. 4 is a sequence diagram relating to another secure, symmetric key protocol 400 for pairing at least two ECUs 106 via the backend server 208. More specifically, FIG. 4 shows an example of a secure, symmetric key protocol 400 that limits the number of times an ECU 106 is permitted to be paired with another ECU 106. In addition, TABLE 2 provides information regarding the secure, symmetric key protocol 400, which is illustrated in FIG. 4.

TABLE 2

| Ref. No. | From/To | Message/Operation |
|---|---|---|
| 402 | B | Contains master secret s |
| 404 | $E_2$ | Contains $H^N$ (s) |
| 406 | $E_1 \rightarrow E_2$ | Request ID |
| 408 | $E_2 \rightarrow E_1$ | $E_2$ ID |
| 410 | $E_1 \rightarrow B$ | $E_2$ ID |
| 412 | B | ctr = ctr + 1 |
| 414 | $B \rightarrow E_1$ | Return s' = $H^{N-ctr}$ (s) |
| 416 | $E_1$ | $Key_{E_2}$ = H (s') |
| 418 | | Perform Key Agreement between $E_1$ and $E_2$ |
| 420 | $E_1 \rightarrow E_2$ | Enc(s') |
| 422 | $E_2$ | Verify $Key_{E_2}$ = H(s') update $Key_{E_2} \leftarrow$ s' |

In this secure pairing protocol 400, as shown at step 402, the backend server 208 is provisioned with a master secret (denoted as s). In addition, the second ECU 106 is provisioned with a secret value obtained by applying a hash function (denoted by H) to the master secret for a total of N times, as denoted by $H^N(s)$ at step 404 in which N represents an integer value and N≥1. Also, the backend server 208 maintains a counter (denoted as ctr), which is incremented each time that the second ECU 106 ($E_2$) pairs with an ECU 106. At step 406, according to an example, the first ECU 106 sends at least one message to request the unique ID of the selected ECU 106 (e.g., the second ECU 106) that will be paired with the first ECU 106. At step 408, according to an example, the second ECU 106 sends at least one message to provide its unique ECU identifier (e.g., $E_2ID$) to the first ECU 106.

Upon receiving at least one message with the unique ECU identifier ($E_2ID$) of the second ECU 106, the first ECU 106 requests the backend server 208 to permit the first ECU 106 to pair with the second ECU 106 at step 410 according to an example. The backend server 208 receives the pairing request from the first ECU 106 and updates its counter at step 412 according to an example. Next, at step 414, according to an example, the backend server 208 sends at least one message, which includes $s'=H^{N-ctr}(s)$, to the first ECU 106, where (ctr−1) represents the number of times that the first ECU 106 has been paired before this instance. By applying the hash function to this value, the first ECU 106 is configured to compute the current secret at step 416 according to an example. More specifically, the first ECU 106 computes the current secret stored on the second ECU 106 in which the current secret is represented as $H^{N-ctr}(s)$. At step 416, this current secret is used to derive the session keys (e.g., encryption key and MAC key) for this instance of pairing.

In addition, the first ECU 106 and the second ECU 106 perform a key agreement at step 418, according to an example. Also, at step 420, according to an example, the first ECU 106 sends $H^{N-ctr}(s)$ to the second ECU 106 over the encrypted channel. The second ECU 106 is configured to verify that H applied to $H^{N-ctr}(s)$ gives the value of the current secret stored on the second $E_2$, where the current secret is $H^{N-ctr+1}(s)$. This authenticates the first ECU 106 to the second ECU 106 since the backend server 208 will release the value of $H^{N-ctr}(s)$ only to a valid ECU 106. Finally, at step 422, according to an example, the second ECU 106 updates its internal secret to $H^{N-ctr}(s)$, which is the previous value in the hash chain applied to the master secret. This new internal secret (i.e., $H^{N-ctr}(s)$) will become the basis for the next pairing of this second ECU 106 ($E_2$), should there be another pairing in the future.

By using a non-invertible, cryptographic hash function, the system 200 does not allow for any party other than the backend server 208 to know the master secret except the last time the second ECU 106 is allowed to pair (during the last time, the first ECU $E_1$ and the second ECU $E_2$ learn the master secret). Since the backend server 208 will only release the pairing value ($H^{N-ctr}(s)$) for a total of N times, the system 200 is configured to ensure that the second ECU 106 is not paired more than N times.

As described in this disclosure, the system 200 provides a number of advantages and benefits. For example, the system 200 includes a pairing protocol (e.g., protocol 300, protocol 400, or variations thereof), which is configured to operate and/or be performed at a relatively fast speed due to use of symmetric key operations. In this regard, the ECUs 106 do not have to support computationally expensive asymmetric key operations. Also, the ECUs 106 do not have to use certificates and their associated public key infrastructure (PKI) for authentication. In addition, the system 200 includes the secure backend server 208 to mediate secure and performant pairing between ECUs 106. In addition, the system 200 enables ECUs 106 to evaluate each other's security posture before pairing. The system 200 also enables tracking of ECU pairing across the lifetime of an ECU 106 to prevent counterfeiting or other illegitimate use in the field.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for secure pairing, the method comprising:
   sending first identification data of a first electronic control unit (ECU) to a second ECU;
   receiving second identification data of the second ECU from the second ECU;
   sending a message to a server, the message indicating a request to establish a pairing between the first ECU and the second ECU;
   receiving session data from the server, the session data including (a) session identification data to identify the pairing between the first ECU and the second ECU, (b) a master session key (MSK), (c) a first token, and (d) security information of the second ECU;
   generating one or more session keys based on the MSK;
   sending the session identification data and an encryption of the first token to the second ECU;
   receiving an encryption of a second token from the second ECU;
   decrypting the encryption of the second token using the one or more session keys;
   validating the second token using the second identification data of the second ECU; and
   establishing secure communication of the first ECU with the second ECU via at least the one or more session keys after the second token is validated.

2. The computer-implemented method of claim 1, wherein:
   the one or more session keys include at least a first session key and a second session key;
   the first session key is an encryption key that is derived from at least the MSK; and
   the second session key is a message authentication code (MAC) key that is derived from at least the MSK.

3. The computer-implemented method of claim 1, further comprising:
generating the encryption of the first token using the one or more session keys; and
generating the encryption of the second token using the one or more session keys,
wherein,
the first token contains the first identification data of the first ECU that is encrypted by a first pre-shared key,
the first pre-shared key is shared by the first ECU and the server,
the second token contains the second identification data of the second ECU that is encrypted by a second pre-shared key, and
the second pre-shared key is shared by the second ECU and the server.

4. The computer-implemented method of claim 1, wherein:
the first ECU communicates with the server via a secure communication channel;
the second ECU communicates with the server via the secure communication channel; and
the secure communication channel is an encrypted and integrity-protected channel.

5. The computer-implemented method of claim 1, wherein the security information of the second ECU includes at least ECU model data and firmware version data.

6. The computer-implemented method of claim 1, wherein:
the second ECU receives the master session key, the second token, and security information of the first ECU from the server; and
the second ECU evaluates the security information of the first ECU before sending the encryption of the second token to the first ECU.

7. The computer-implemented method of claim 1, wherein:
the first ECU is configured to perform a pairing operation only a predetermined number of times;
the predetermined number of times is greater than or equal to one; and
the first ECU is in an unpaired state before the pairing operation commences.

8. A system for secure pairing comprising:
a first electronic control unit (ECU) including (i) a processor and (ii) a non-transitory computer readable medium in data communication with the processor, the non-transitory computer readable medium having computer readable data including instructions stored thereon that, when executed by the processor, cause the processor to perform a method that comprises:
sending first identification data of the first ECU to a second ECU;
receiving second identification data of the second ECU from the second ECU;
sending a message to a server, the message indicating a request to establish a pairing between the first ECU and the second ECU;
receiving session data from the server, the session data including (a) a session identification data to identify the pairing between the first ECU and the second ECU, (b) a master session key (MSK), (c) a first token, and (d) security information of the second ECU;
generating one or more session keys based on the MSK;
sending the session identification data and an encryption of the first token to the second ECU;
receiving an encryption of a second token from the second ECU;
decrypting the encryption of the second token using the one or more session keys;
validating the second token using the second identification data of the second ECU; and
establishing secure communication of the first ECU with the second ECU via at least the one or more session keys after the second token is validated.

9. The system of claim 8, wherein:
the one or more session keys include at least a first session key and a second session key;
the first session key is an encryption key that is derived from the MSK; and
the second session key is a message authentication code (MAC) key that is derived from the MSK.

10. The system of claim 8, wherein the method further comprises:
generating the encryption of the first token using the one or more session keys; and
generating the encryption of the second token using the one or more session keys,
wherein,
the first token contains the first identification data of the first ECU that is encrypted by a first pre-shared key,
the first pre-shared key is shared by the first ECU and the server,
the second token contains the second identification data of the second ECU that is encrypted by a second pre-shared key, and
the second pre-shared key is shared by the second ECU and the server.

11. The system of claim 8, wherein:
the first ECU communicates with the server via a secure communication channel;
the second ECU communicates with the server via the secure communication channel; and
the secure communication channel is an encrypted and integrity-protected channel.

12. The system of claim 8, wherein the security information of the second ECU includes at least ECU model data and firmware version data.

13. The system of claim 8, wherein:
the second ECU receives the master session key, the second token, and security information of the first ECU from the server; and
the second ECU evaluates the security information of the first ECU before sending the encryption of the second token to the first ECU.

14. The system of claim 8, wherein:
the first ECU is configured to perform a pairing operation only a predetermined number of times;
the predetermined number of times is greater than or equal to one; and
the first ECU is in an unpaired state before the pairing operation commences.

15. A non-transitory computer readable medium having computer readable data including instructions stored thereon that, when executed by a processor, cause the processor to perform a method for secure pairing, the method including:
sending first identification data of a first electronic control unit (ECU) to a second ECU;
receiving second identification data of the second ECU from the second ECU;

sending a message to a server, the message indicating a request to establish a pairing between the first ECU and the second ECU;

receiving session data from the server, the session data including (a) a session identification data to identify the pairing between the first ECU and the second ECU, (b) a master session key (MSK), (c) a first token, and (d) security information of the second ECU;

generating one or more session keys based on the MSK;

sending the session identification data and an encryption of the first token to the second ECU;

receiving an encryption of a second token from the second ECU;

decrypting the encryption of the second token using the one or more session keys;

validating the second token using the second identification data of the second ECU; and establishing secure communication of the first ECU with the second ECU via at least the one or more session keys after the second token is validated.

16. The non-transitory computer readable medium of claim 15, wherein:

the one or more session keys include at least a first session key and a second session key;

the first session key is an encryption key that is derived from the MSK; and the second session key is a message authentication code (MAC) key that is derived from the MSK.

17. The non-transitory computer readable medium of claim 15, wherein the method further comprises:

generating the encryption of the first token using the one or more session keys; and generating the encryption of the second token using the one or more session keys, wherein, the first token contains the first identification data of the first ECU that is encrypted by a first pre-shared key, the first pre-shared key is shared by the first ECU and the server, the second token contains the second identification data of the second ECU that is encrypted by a second pre-shared key, and the second pre-shared key is shared by the second ECU and the server.

18. The non-transitory computer readable medium of claim 15, wherein the first ECU communicates with the server via a secure communication channel;

the second ECU communicates with the server via the secure communication channel; and the secure communication channel is an encrypted and integrity-protected channel.

19. The non-transitory computer readable medium of claim 15, wherein the security information of the second ECU includes at least ECU model data and firmware version data.

20. The non-transitory computer readable medium of claim 15, wherein:

the second ECU receives the master session key, the second token, and security information of the first ECU from the server; and the second ECU evaluates the security information of the first ECU before sending the encryption of the second token to the first ECU.

* * * * *